United States Patent [19]

Gosselin

[11] Patent Number: 5,217,376
[45] Date of Patent: Jun. 8, 1993

[54] DRAWING AID

[76] Inventor: Marcel Gosselin, C.P. 72, LaSalle, Manitoba, Canada, R0G 1B0

[21] Appl. No.: 855,758

[22] Filed: Mar. 20, 1992

[51] Int. Cl.⁵ .............................................. G09B 11/00
[52] U.S. Cl. ....................................... 434/91; 434/85
[58] Field of Search ........................ 434/88, 90, 91, 85

[56] References Cited
U.S. PATENT DOCUMENTS

| | | | |
|---|---|---|---|
| 1,111,608 | 9/1914 | O'Brien | 434/88 |
| 2,257,005 | 9/1941 | Grosse | 434/88 X |
| 2,420,316 | 5/1947 | Hine | 434/91 |
| 2,571,613 | 10/1951 | Rissland | 434/91 |
| 4,340,372 | 7/1982 | Brassine | 434/88 |
| 4,600,393 | 7/1986 | Rosenwinkel et al. | 434/88 |
| 5,100,325 | 3/1992 | Cutter | 434/91 |

Primary Examiner—Paul J. Hirsch
Assistant Examiner—L. Thomas
Attorney, Agent, or Firm—Adrian D. Battison; Stanley G. Ade; Murray E. Thrift

[57] ABSTRACT

An artist's drawing aid comprises a screen through which a three dimensional object can be observed. The screen is transparent allowing the object to be traced onto the screen using an eye piece to hold the eye position stationary. When traced, the object can be transferred to a translucent sheet of paper by placing the paper over the screen and by illuminating the screen through one edge so as to illuminate the traced lines. The screen is mounted on a easel construction with a shield above the screen. Edge illumination can be effected by a light bulb or by a cylindrical lens mounted on the edge of the screen and movable transversely of the edge to properly direct ambient light into the screen.

16 Claims, 3 Drawing Sheets

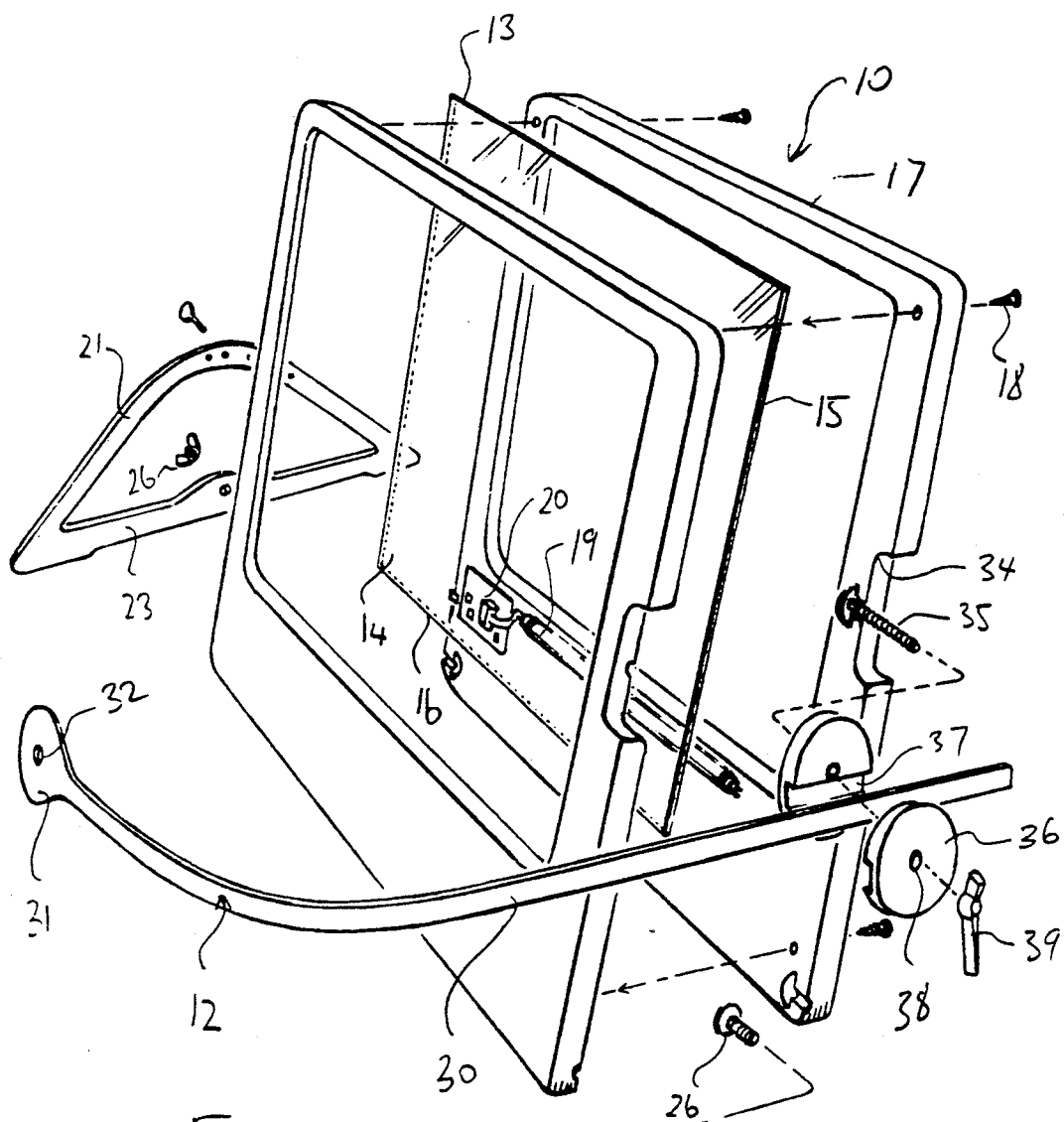
Fig. 2
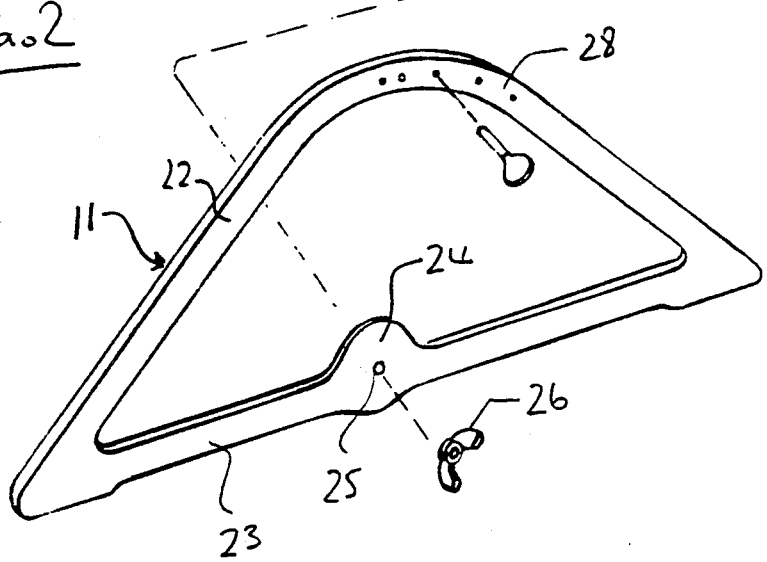

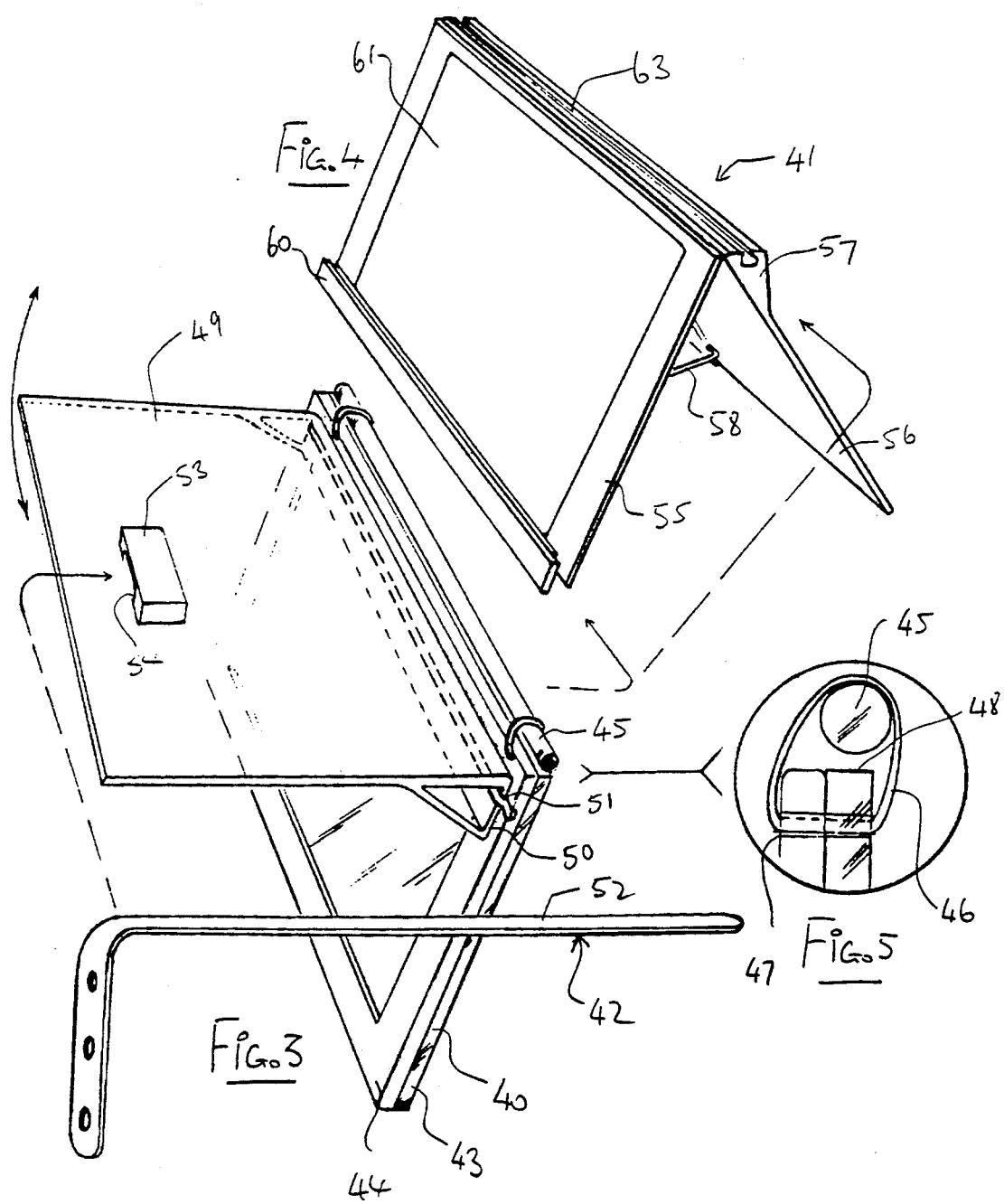

DRAWING AID

BACKGROUND OF THE INVENTION

This invention relates to an apparatus for assisting a person in drawing a three dimensional object.

Many students have difficulty in drawing a three dimensional object in the sense that they cannot translate the different surfaces of the object visible in the three dimensional form into a two dimensional representation of those surfaces. This tends to occur because the student moves the point of reference for the object that is the position of the eye around the object while attempting to illustrate the object so that the object tends to be illustrated from a number of different positions. While this may be artistic, it does not lead to a realistic representation of the object being observed.

SUMMARY OF THE INVENTION

It is one object of the present invention, therefore, to provide an improved device for use in assisting a person in the illustration of a three dimensional object.

According to a first aspect of the invention there is provided a method for assisting drawing of a three dimensional object comprising viewing the object through a substantially transparent flat plastics screen having a front surface, a rear surface and at least one edge, supporting the screen such that the object can be viewed therethrough from the front surface through the rear surface with the object behind the rear surface, marking on the front surface of the screen using a marker to form lines on the front surface tracing an outline of the object as viewed, placing a sheet of translucent material on the front surface of the screen to cover said marked lines, supplying light through said edge of the screen, the marker having the characteristic that when the screen is illuminated by light supplied through said edge the marked lines formed by the marker are illuminated by causing extraction of light through the front surface of the screen at the lines and tracing the illuminated marked lines onto the translucent sheet.

According to a second aspect of the invention there is provided, therefore an apparatus for assisting drawing of a three dimensional object comprising a substantially transparent flat plastic screen having a front surface, a rear surface and at least one edge, means for mounting the screen for viewing of the object through the screen and means for supplying light through said edge of the screen for illuminating marked lines applied to the front surface of the screen.

According to a third aspect of the invention there is provided an apparatus for drawing comprising a substantially transparent flat plastic screen having a front surface, a rear surface and at least one edge, and means for supplying light through said edge of the screen for illuminating marked lines applied to the front surface of the screen, the source of light comprising an elongate lens member extending substantially along the full length of the edge and arranged to concentrate light from an ambient source into the edge and means mounting the lens member for movement relative to the edge for directional control of the illumination from the ambient source.

One or more embodiments of the invention will now be described in conjunction with the accompanying drawings.

BRIEF DESCRIPTION OF THE DRAWINGS

FIG. 2 is an exploded view of the embodiment of FIG. 1.

FIG. 3 is an exploded view of a first portion of a second embodiment according to the present invention.

FIG. 4 is an isometric view of an easel portion for supporting the screen portion of FIG. 3.

FIG. 5 is a view along one edge of the screen showing on an enlarged scale the edge of the screen and a lens arrangement.

In the drawings like characters of reference indicate corresponding parts in the different figures.

DETAILED DESCRIPTION

Figure 1:
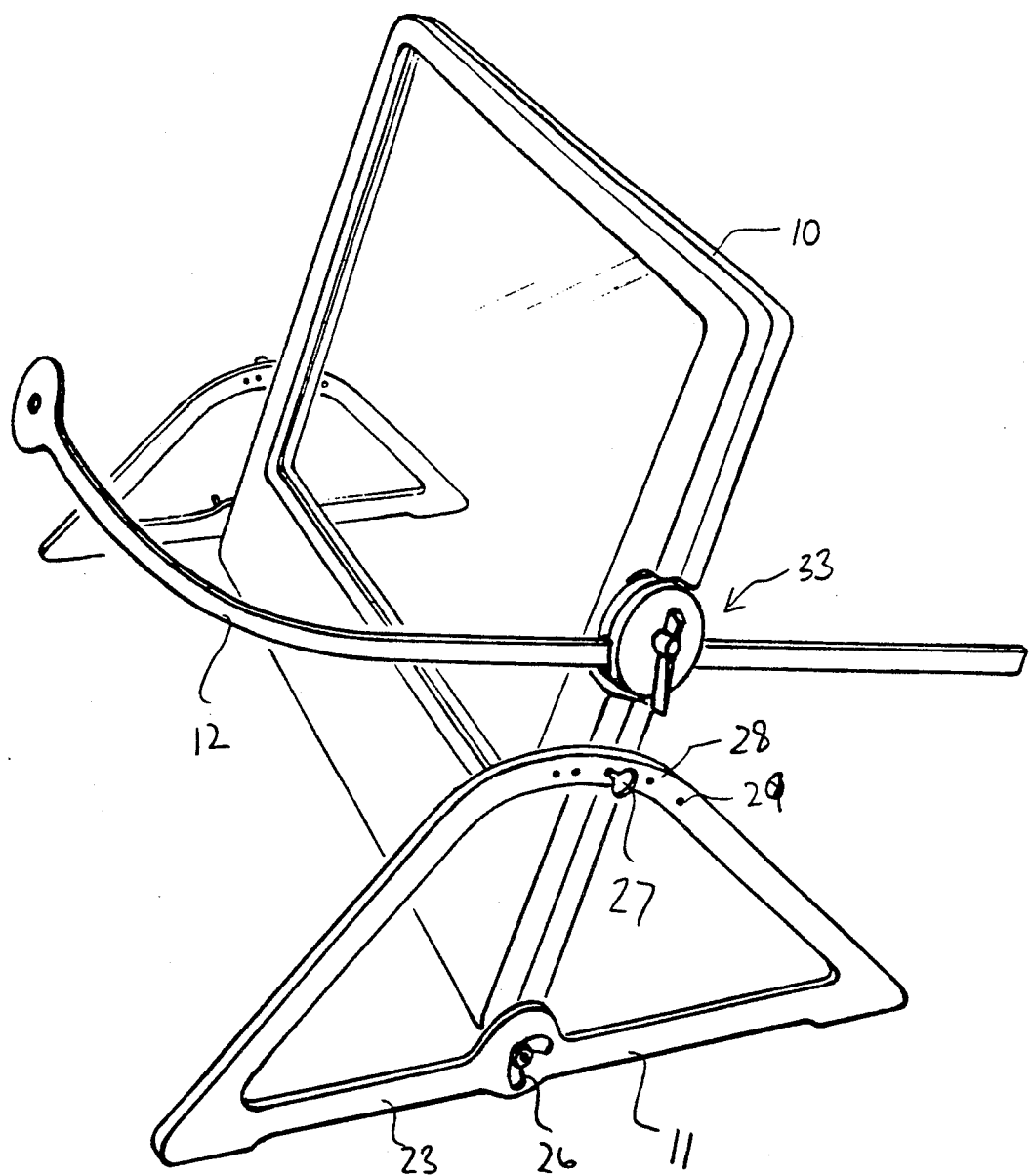
FIG. 1 is an isometric view of a first embodiment of the invention.

A first embodiment is shown in FIGS. 1 and 2 and comprises a screen portion 10, a mounting stand 11 and an eye piece 12.

The screen portion comprises a thin flat plastic screen 13 having a front face 14 and a rear face 15. The screen is rectangular with a lower most edge 16. The screen is mounted in a surrounding frame element 17 formed of a suitable molded plastics material so the screen is maintained and held within the frame by clamping two portions of the frame together by screws 18. At a lower part of the frame is provided an elongate light bulb 19 supplied with power from an electrical connection 20. The screen can thus be illuminated by the supply of light from the light bulb 19 into the lower edge 16 of the screen with that light being transmitted internally of the screen to exit at the other three edges of the screen unless the light is caused to escape through one of the surfaces of the screen.

The frame is a generally rectangular frame which has a width sufficient to receive and clamp the edges of the screen and is of increased width at the lower part parallel to the lowermost edge 16 to receive the bulb 19 and a suitable electrical connection.

The mounting bracket 11 comprises a pair of triangular mounting elements 21 and 22. Each of the mounting elements is generally planar with a flat base portion 23 which can lie in contact with a mounting surface for example the surface of a desk on which the device is to be used. A central portion of the base 23 is increased in height as indicated at 24 and is provided with a central opening 25 which receives a captive screw 26 mounted in a side edge of the frame adjacent a bottom edge of the frame. The screw thus projects outwardly from the side edge and engages through the opening 25 and can be held in place by a nut 26A. Thus the screws 26 provide a pivot action of the frame and screen portion relative to the side frame elements about an axis defined by the screws 26. The axis is thus horizontal and positioned adjacent the bottom edge of the screen portion. The angle of the screen portion can thus be adjusted from a substantially vertical position forwardly or rearwardly of the vertical position and generally slightly rearwardly so that the screen can be positioned at an angle generally at right angles to the line of sight of the user when viewing an object through the screen.

The screen portion can be locked at the required angle by engagement of a pin 27 with an apex portion 28 of the side mounting element. Each mounting element therefore includes an upstanding portion converging from the ends of the base portion 23 upwardly toward the apex 28. At the apex is provided a plurality of openings 29 each of which can receive the pin 27 which engages into a suitable opening in the side of the frame of the screen portion to locate the screen portion at the required angle.

Alternative forms of clamping arrangement for locating the angle of the frame of the screen portion can be provided including frictional arrangements or the provision of a spring pin element mounted on the apex portion and cooperable with an apertured plate attached to the frame.

The eye piece 12 comprises an elongate arm 30 and an aperture portion 31 which extends generally at right angles to the arm 30. The eye piece is smoothly curved to provide an attractive appearance. The aperture member 31 comprises a flat disc having a front surface for engaging the eye area of the user. A central aperture 32 is provided in the disc so that the user can bring the eye up to the eye piece at the disc, place the eye gently against the disc and then view through the aperture thus maintaining the eye fixed at a particular location relative to the screen.

The aperture member can be adjusted in position relative to the screen by movement of the arm 30 relative to a mounting member 33 provided on the side of the frame. The frame thus includes a recess 34 within which the mounting member is located and is carried upon a screw 35 attached to the frame at the recess. The mounting member is indicated at 36 and comprises a disc shaped body formed in two portions and defining a slot 37 therethrough within which the arm 30 can be mounted for sliding movement longitudinally of the arm. The disc member includes a central opening 38 applied onto the screw 35 to be held in place by a nut 39. Tightening of the nut 39 thus clamps the two disc portions together and holds the arm at a fixed position within the slot 37. The nut can be slightly released to allow twisting of the disc about the axis of the screw 35 and/or sliding movement of the arm within the slot. In this way the position of the aperture member 31 can be adjusted to substantially any position across the area of the screen and to a selected distance from the screen.

In operation, the screen is located so that the object O to be drawn can be viewed through the screen with the screen maintained at an angle substantially at right angles to the line of sight. In cases where the object is large and positioned some distance from the screen, the screen will normally be located vertically so that the person can view the whole of the object through the screen. In cases where the object is relatively small, the screen may be inclined rearwardly toward the object so that the relatively small object can be placed upon the support surface behind the screen. The eye piece is then adjusted so that the user can comfortably view the object through the eye piece while reaching the screen with the hands of the user.

With the eye of the user thus located at relatively fixed position by the aperture member, the user views the object and traces the outline of the object O on the screen using a light colored wax marker pen P. Preferably the marker pen selected is of a white colour so that when lines L are applied to the screen they are easily visible against the often multi-tonal subject and background. The lines L thus marked provide on the screen an illustration of the object as it is viewed in a two dimensional format. The fact that the eye of the user is maintained at a fixed position makes the illustration relatively simple and causes the user to mark lines exactly tracing the object as viewed.

When the marking of the outline is complete, the user places a piece of paper S or other similar translucent marking material onto the screen on the front surface of the screen and generally of a size approximating to the size of the screen. The paper can be 16-20 lb weight paper. The pale or white markings on the screen are generally not visible through the translucent material except in the presence of the edge illumination. At this time the illumination provided by the light bulb is continued so that the screen is illuminated through the edge 16. The illumination of the screen in combination with the wax material of the marker causes the lines marked on the screen to be illuminated sharply in contrast to the dull or non illuminated other parts of the screen. This edge illumination is itself a known technique and the alteration of the surface characteristics of the screen causes the light to be emitted at the marked lines. The marked lines are thus readily visible through the translucent material allowing the marked lines to be traced onto the paper or other translucent material thus transferring the illustration onto the paper.

When the transfer by the tracing process is complete, the paper can be removed and the outline of the object used to more artistically illustrate the object by the application of shading, coloring or the like.

The device can be used without the eye piece in some cases where the user is sufficiently skilled to maintain the eye position substantially stationary.

Turning now to FIG. 3, 4 and 5, a second embodiment is shown including a screen portion 40, a mounting assembly 41, an eye piece 42. In this embodiment the screen portion 40 comprises simply a flat plastics sheet 43 to which is attached a surrounding frame 44 on the front face of the sheet so that the edges of the sheet are exposed. The front frame element 44 simply provides a surrounding area to delimit the screen. In this embodiment there is no electrically illuminated light source similar to the bulb of the first embodiment but instead it is replaced by a lens member 45 attached at the upper edge of the sheet 43. The lens member comprises an elongate cylindrical rod having a length substantially equal to the length of the upper edge of the screen with the rod being held in place at the edge by a flexible band 46 engaged around the rod and passing through holes 47 in the screen and in the surrounding frame. The rod 45 can thus be moved forwardly and rearwardly relative to the edge 48 of the screen. The rod acts as a lens member to concentrate light from a greater area and to direct that light into the edge of the sheet so as to edge illuminate the sheet in the manner previously described. Depending upon the positioning of an ambient source such as a window, overhead lighting or the like, the rod will be positioned to focus that light into the edge parallel to the screen.

As the amount of edge illumination obtained from the ambient source is significantly less than that obtainable using electrically light powered source, in this embodiment there is provided a shade member 49 which is opaque and thus prevents ambient light from striking the front surface of the screen. The shade member comprises a flat plate with a triangular section 50 adjacent the screen. The triangular section comprises a flat base at right angles to the plate of the shade and a second leg extending from an edge of the base back toward the main body of the shade. The shade is held in place by an elastic band 51 attached to the sides of the screen and extending through the hollow interior of the triangular section 50. The band has sufficient tension to hold the shade in position as shown extending outwardly at right angles to the screen when the base is positioned against the front surface of the frame. In addition the shade can be turned substantially at right angles so that the band engages the inclined portion of the triangular section so the shade is folded down flat against the front face of the screen.

The eye piece 42 includes the arm 52 which can be positioned at a required location relative to the front surface of the screen by insertion through a mounting bracket 53 on an upper side of the shade. The mounting bracket defines a slot 54 into which the arm can be inserted as a sliding fit.

The easel member comprises a front wall 55 and a rear wall 56 converging toward an apex portion 57. In conventional manner these portions can be folded inwardly to form a flat body or can be folded outwardly to a position as shown and held in the angle position by a transverse brace 58. At the base of the front panel 55 is provided a ledge portion 60 defining a slot onto which the edge of the screen can be mounted so that the screen lies against the front panel. The front panel carries a dark sheet 61 over the majority of the area so as to provide a darkened area behind the screen when the screen is in the position mounted on the ledge 60. This prevents viewing through the screen and provides a dark background for easier observation of the illuminated markings provided by the tracing effect previously described.

The apex 57 includes a further slot 63 again shaped to receive the edge of the screen so that the screen can be located at that position supported above the easel member for the first step of the process that is the observing of the object and the marking of the screen with the marked lines corresponding to the object.

As an alternative position on the easel member, the screen can be positioned at one end of the lower slot defined by the ledge 60 so that the screen projects outwardly from one side of the easel member.

The method of use of the second embodiment is substantially the same as that previously described except that during the tracing process using the translucent material or paper, the screen is positioned over the dark area to make the tracing of the illuminated markings more readily visible.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method for assisting drawing on a translucent sheet material of a three dimensional object comprising viewing the object through a substantially transparent flat plastics screen having a front surface, a rear surface and at least one edge, supporting the screen such that the object can be viewed therethrough from the front surface through the rear surface with the object behind the rear surface, marking on the front surface of the screen using a marker to form lines on the front surface tracing an outline of the object as viewed, placing the sheet of translucent material on the front surface of the screen to cover said marked lines, supplying light through said edge of the screen, the marker having the characteristic that when the screen is illuminated by light supplied through said edge the marked lines formed by the marker are illuminated by causing extraction is light through the front surface of the screen at the lines and tracing the illuminated marked lines onto the translucent sheet.

2. The method according to claim 1 wherein the sep of viewing the object further includes viewing the object through a stationary eye piece mounted forwardly of the front surface of the screen, the eye piece being adjustable in position relative to the front surface.

3. The method according to claim 2 wherein the eye piece comprises a surface arranged to be brought to a position adjacent the eye and a hole through the surface through which the object can be observed.

4. The method according to claim 2 wherein the eye piece is mounted upon an arm connected to the screen and movable relative to the screen.

5. The method according to claim 1 wherein the marker comprises a wax marker of a pale colour allowing viewing of the object beyond the marked lines and through the screen.

6. The method according to claim 1 wherein during the step of illuminating the screen there is provided a darkened area behind the rear surface of the screen during the illumination and tracing of the marked lines.

7. The method according to claim 1 wherein the step of supplying light through an edge of the screen includes providing a source of light at said edge of said screen arranged to direct light into the edge.

8. The method according to claim 7 wherein the source of light comprises an elongate cylindrical lens member extending substantially along the full length of the edge and arranged to concentrate light from ambient light into the edge and the lens member is mounted immediately adjacent the edge for movement transversely of the screen relative to the edge for directional control of the illumination from the ambient light.

9. Apparatus for assisting drawing of a three dimensional object comprising a substantially transparent flat plastic screen having a front surface, a rear surface and at least one edge, means for mounting the screen for viewing of the object through the screen means for supplying light through said edge of the screen for illuminating marked lines applied to the front surface of the screen, and a stationary eye piece mounted forwardly of the front surface of the screen, the eye piece being adjustable in position relative to the front surface, the eye piece comprising a surface arranged to be brought to a position adjacent the eye and a hole through the surface through which the object can be observed, and the eye piece being mounted upon an arm connected to the screen and movable relative to the screen.

10. The apparatus according to claim 9 including a marker comprising a wax marker of a pale colour allowing viewing of the object beyond the marked lines and through the screen.

11. The apparatus according to claim 9 including a dark covering for the rear surface of the screen.

12. The apparatus according to claim 9 wherein the means for supplying light comprises an elongate cylindrical lens member extending substantially along the full length of the edge and arranged to concentrate light from ambient light into the edge and means mounting the lens member immediately adjacent the edge for movement transversely of the screen relative to the edge for directional control of the illumination from the ambient source.

13. Apparatus for assisting drawing of a three dimensional object comprising a substantially transparent flat plastic screen having a front surface, a rear surface and at least one edge, means for mounting the screen for viewing of the object through the screen means for supplying light through said edge of the screen for illuminating marked lines applied to the front surface of the screen and shade member mounted relative to the screen so as to be movable from a folded position substantially flat against the screen to an outwardly projecting position extending substantially at right angles to the screen so as to shade the front surface of the screen from ambient illumination.

14. The apparatus according to claim 13 including an eye piece having an arm mounted on said shade member for adjustable movement relative thereto and an apparatus portion mounted upon an end of the arm remote from the shade member for viewing of the object through the aperture member and through the screen.

15. The apparatus according to claim 9 wherein the mounting means comprises an easel member defining a first position for receiving the screen mounted thereon and providing a dark opaque background for positioning adjacent the screen when in the first position and means for mounting the screen at a second position such that the screen is unobscured for viewing of the object.

16. Apparatus for use in drawing comprising a substantially transparent flat plastic screen having a front surface, a rear surface and at least one edge, and means for supplying light through said edge of the screen for illuminating marked lines applied to the front surface of the screen, the source of light comprising an elongate cylindrical lens member extending substantially along the full length of the edge and arranged to concentrate light from ambient light into the edge and means mounting the lens member immediately adjacent the edge for movement transversely of the screen relative to the edge for directional control of the illumination from the ambient light.

* * * * *